United States Patent [19]

Lueders et al.

[11] 4,020,143
[45] Apr. 26, 1977

[54] USE OF RAW MANGANESE NODULES FOR OXIDATION LEACHING OF REDUCTIVELY ROASTED MANGANESE NODULES

[75] Inventors: Robert E. Lueders, Needham; Roger N. Kust, Acton, both of Mass.; Lester J. Szabo, York, Canada

[73] Assignee: Kennecott Copper Corporation, New York, N.Y.

[22] Filed: Aug. 26, 1974

[21] Appl. No.: 500,492

[52] U.S. Cl. .................. 423/32; 423/53; 423/150; 423/49; 75/103
[51] Int. Cl.² .................. C01G 3/14; C01G 51/12; C01G 53/12; C01G 39/00
[58] Field of Search ............ 75/1, 21, 26, 72, 80, 75/82, 103, 117, 119, 121; 423/32, 33, 150, 53, 24, 49

[56] References Cited

UNITED STATES PATENTS

| | | | |
|---|---|---|---|
| 936,762 | 10/1909 | Crispo | 423/41 |
| 1,349,322 | 8/1920 | Clevenger et al. | 75/21 |
| 2,647,830 | 8/1953 | Allen et al. | 423/32 X |
| 3,169,856 | 2/1965 | Mero | 75/119 |
| 3,224,873 | 12/1965 | Swanson | 423/24 |
| 3,330,096 | 7/1967 | Zimmerley | 55/73 |
| 3,375,097 | 3/1968 | Welsh | 423/49 |
| 3,471,285 | 10/1969 | Rolf | 75/103 |
| 3,615,340 | 10/1971 | Fuqua | 75/26 |
| 3,714,326 | 1/1973 | Matson | 423/150 |
| 3,734,715 | 5/1973 | Redman | 75/103 |
| 3,736,125 | 5/1973 | Wilder | 75/103 |
| 3,751,554 | 8/1973 | Bare | 423/32 |
| 3,753,686 | 8/1973 | Wilder et al. | 75/103 |
| 3,853,981 | 12/1974 | Hadzeriga | 423/32 X |

OTHER PUBLICATIONS

Brooks et al., "Experiments in Processing Marine Nodules," Proceedings 9th Mineral Processing Congress, Prague, Czechoslovakia, June 1-6, 1970.

*Primary Examiner*—G. O. Peters
*Assistant Examiner*—Brian E. Hearn
*Attorney, Agent, or Firm*—John L. Sniado; Lowell H. McCarter; Anthony M. Lorusso

[57] ABSTRACT

A metal recovery process in which copper, nickel, cobalt and molybdenum are recovered by reducing comminuted raw manganese nodules and leaching the reduced nodules with an aqueous ammoniacal solution to obtain a leach solution containing these metal values. In order to recover copper from leach solutions by techniques such as ion exchange extraction, it is desirable to oxidize the copper to the cupric state.

In another embodiment, oxidation is required to bring about the solution of reduced metallic metal values of copper, nickel and cobalt or to convert lower valence ions of these metals to a more highly oxidized state. The present invention is an improvement in the foregoing metal recovery processes. In the present invention manganese nodules are used as the oxidizing agent to oxidize slurries containing pre-reduced manganese nodules which have lower valence ions of metals such as copper or the metal itself. In the process of this oxidation reaction, the manganese nodule used as an oxidizing agent is itself reduced and its metal values are added to the leach solution.

46 Claims, 6 Drawing Figures

COOLING CIRCUIT

FIRST STAGE LEACH

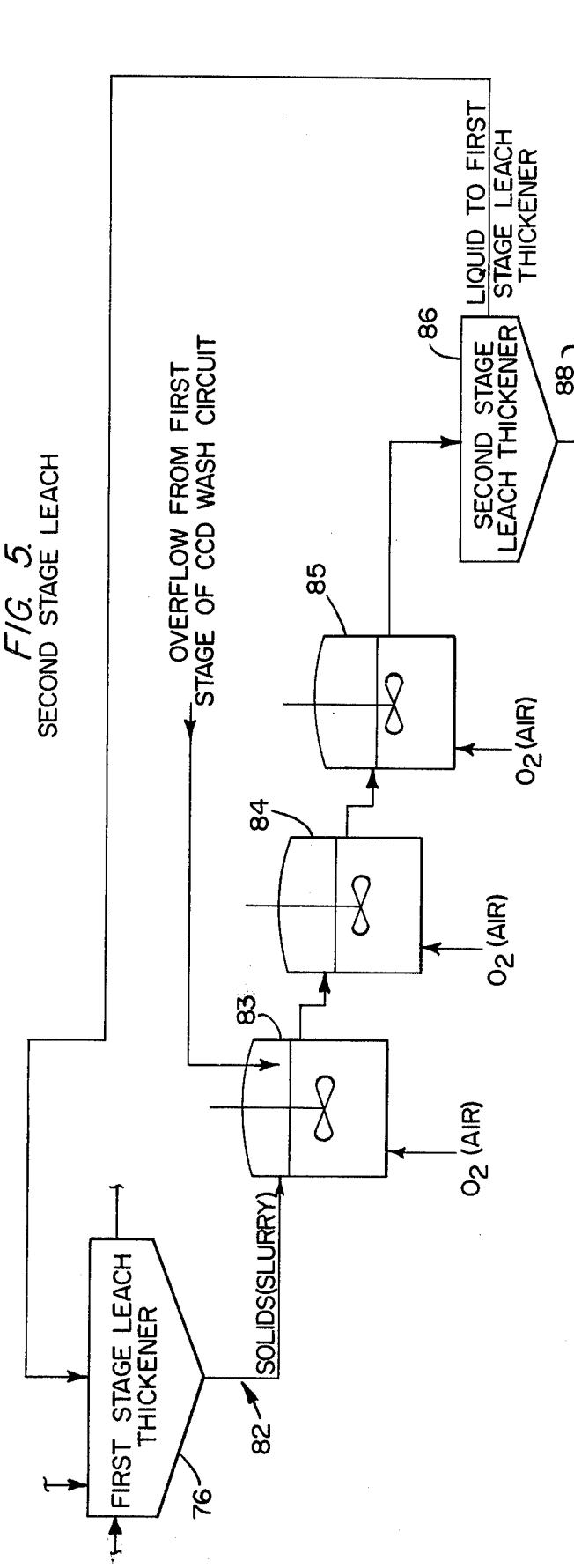
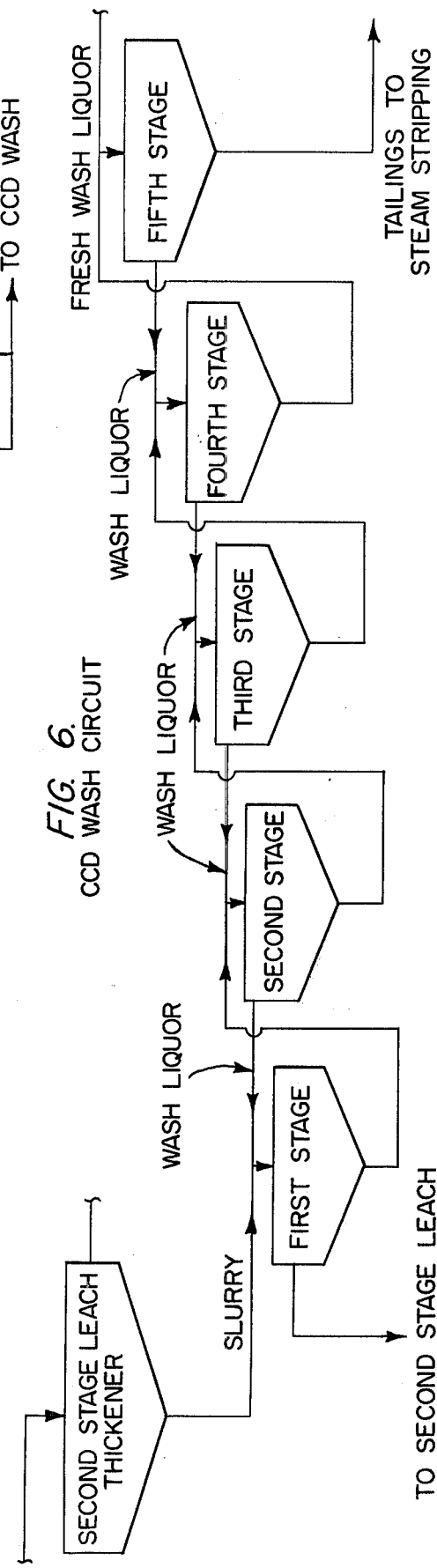
FIG. 5. SECOND STAGE LEACH
FIG. 6. CCD WASH CIRCUIT

USE OF RAW MANGANESE NODULES FOR OXIDATION LEACHING OF REDUCTIVELY ROASTED MANGANESE NODULES

BACKGROUND OF THE INVENTION

In U.S. Pat. No. 3,983,017 entitled, "Recovery of Metal Values from Manganese Deep Sea Nodules" by Lester J. Szabo, the teachings of which are incorporated herein by reference, a process is disclosed in which copper, nickel, cobalt and molybdenum are recovered from raw manganese nodules with an aqueous ammoniacal leach solution containing cuprous ions. The process disclosed in U.S. Pat. No. 3,983,017 is a significant breakthrough in the metallurgical art in that it significantly expands the world's source of copper, nickel, cobalt and molybdenum. The process disclosed in U.S. Pat. No. 3,983,017 has come to be called the "cuprion process" and includes the step of contacting ground manganese nodules with an ammoniacal leach solution containing cuprous ions in a reaction vessel to reduce the manganese oxides in the nodules to enable metal values such as copper, nickel, cobalt and molybdenum to be solublized. The nodule residue is washed with an ammoniacal ammonium carbonate solution to remove these entrained metal values from the residue and place them in a wash-leach solution from which they can be recovered. The reduction liquor can be recycled to the reaction vessel in which the manganese nodules are added. To maintain a sufficient amount of cuprous ions, a reducing gas, such as carbon monoxide, is passed through the reaction vessels. In the cuprion process, metal values are recovered from the wash-leach solution. One advantageous method of recovering the copper and nickel values from the wash-leach solution is to extract them with an oxime type ion exchanger. However, this type of ion exchange reactant is known to be inefficient in extracting cuprous ions and the copper metal values in the wash-leach solution are present predominantly as cuprous ions. In the prior art version of the cuprion process, the wash-leach solution is oxidized with air prior to contacting the oxime extractant to convert the lower valence ions to their more oxidized state. Another reason for oxidizing the wash-leach solution is to liberate carbon monoxide which is complexed with cuprous ion and thereby prevent the slow liberation of carbon monoxide in the subsequent wash operations.

Another similar metal recovery process in which manganese nodules are reduced to enable metal values to be recovered therefrom is the so called fluid bed process. This process is set forth in U.S. patent application Ser. No. 500,493 entitled "Two-Stage Fluid Bed Reduction of Manganese Nodules" by H. E. Barner, D. S. Davies and L. J. Szabo, filed Aug. 26, 1974, the teachings of which are incorporated herein by reference.

In this process, manganese ore nodules are treated in a two-stage fluid bed process to produce a leachable product. In the first stage, dried nodules are calcined using direct fuel injection under a neutral or slightly oxidizing atmosphere to remove about one-half of the oxygen content. Subsequently, in the second stage, the calcined nodules are reduced with synthesis gas to render the metal values leachable. The metal values such as copper and nickel are leached from the cooled nodules with an ammonia-ammonium carbonate leach solution with air as an oxidant. It should be noted that prior to leaching, the ore is reduced to a point where the metal values are present as the metals themselves. In order to get the metals into solution they must be oxidized. A patent illustrating that oxidation during leaching is necessary in processes such as the fluid bed process in U.S. Pat. No. 1,487,145 by M. H. Caron.

In the Caron patent, nickel is recovered from lateritic ores by reducing the nickel in the ore to nickel metal. Thereafter, the nickel metal is oxidized by air in the presence of ammonia. The air causes the nickel to oxidize and dissolve in the ammoniacal solution.

Two other publications which teach to oxidize leach solutions with air to dissolve the metal values are given below:

U.S. Pat. No. 2,556,215 entitled "Method of Producing High-Grade Iron Oxide from Ores Rich in Nickeliferous Pyrrhotite" by Queneau et al, and, Experiments in Processing Marine Nodules, Brooks, P.T. et al., Processing Congress, Prague, Czech, June, 1970, p. 331.

SUMMARY OF THE INVENTION

In accordance with the present invention, raw manganese nodules are used as an oxidant during leaching of reduced nodules and reduced metals in lieu of air or oxygen.

A significant advantage derived from the present invention is that the nodules used as an oxidant during leaching are reduced which render them leachable. In the cuprion process this results in a reduction in the required amount of carbon monoxide, while in the fluid bed process less synthesis gas is required.

Accordingly, it is an object of the invention to provide a method in which manganese nodules are used as an oxidant during leaching of base metal values such as copper, nickel, cobalt and molybdenum.

Another object of the invention is to provide a process in which manganese nodules are used as an oxidant and in which the metal values in the oxidant are rendered leachable.

Another object of the invention is to provide a method for reducing manganese ores which utilizes less reducing gases than prior art processes.

BRIEF DESCRIPTION OF THE DRAWING

FIG. 2–6 is a flow sheet illustrating the fluid bed embodiment of the present invention.

DESCRIPTION OF THE PREFERRED EMBODIMENTS

Figure 1:
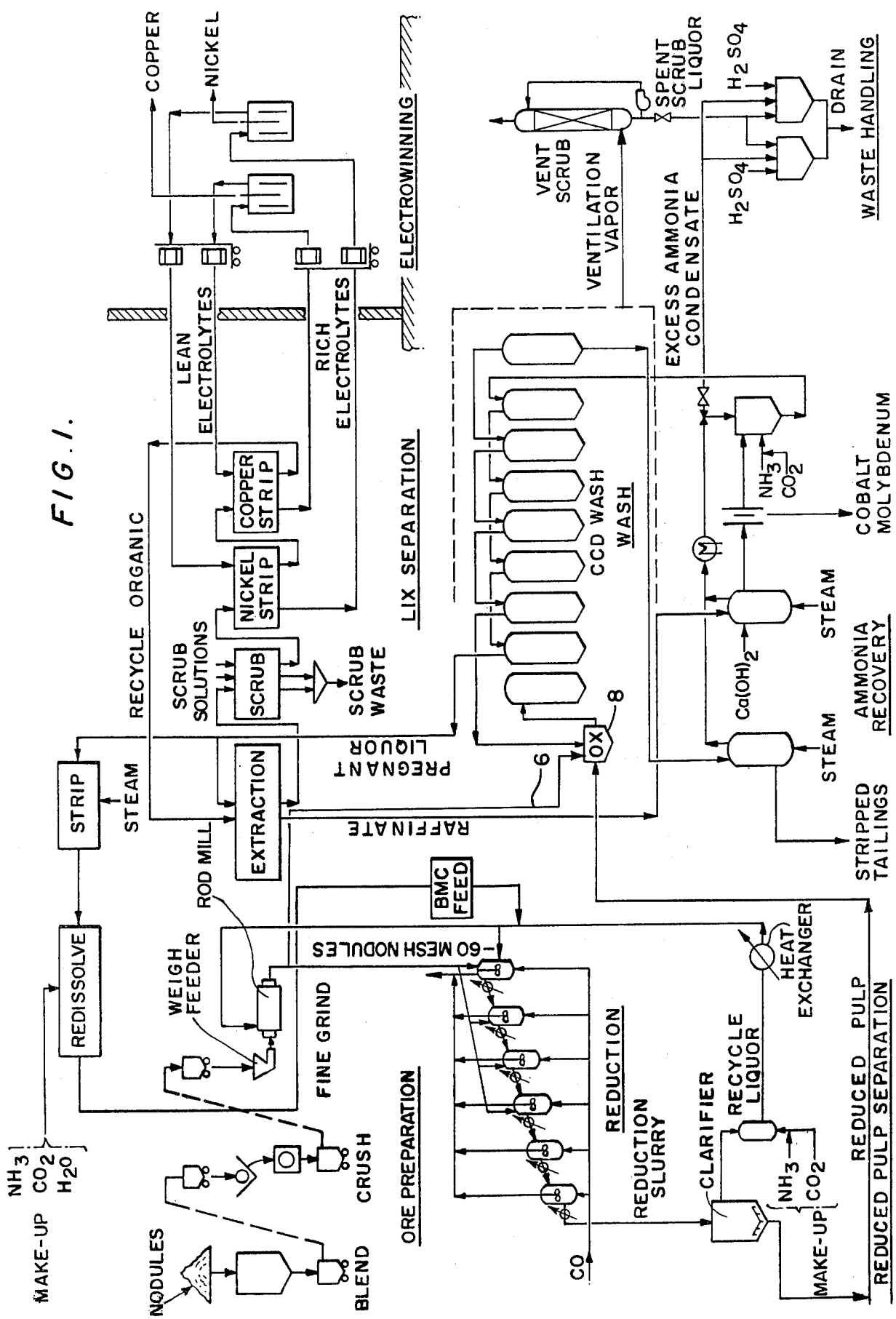
FIG. 1 is a flow sheet illustrating the cuprion embodiment of the present invention.

At the outset, the process of the present invention is described in its broadest overall aspects with a more detailed description following. The present invention is directed to the recovery of metal values from manganese deep sea nodules. For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. *The Mineral Resources of the Sea*, John L. Mero, Elsevier Oceanography Series, Elsevier Publishing Company, 1965, discusses on pages 127 – 241 various aspects of manganese nodules. For a detailed chemical analysis of nodules from the Pacific Ocean see pages 449 and 450 in the *The Encyclopedia of Oceanography*, edited by R. W. Fairbridge, Reinhold Publishing Corp., N.Y. 1966, and U.S. Pat. No. 3,169,856. For the purpose of this invention the complex ores will be considered as containing the following approximate metal content range on a dry basis:

| METAL CONTENT ANALYSIS RANGE | |
| --- | --- |
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel and emphasized because, from an economic standpoint, they are the most significant metals in most of the ocean floor ores.

In the cuprion process, raw manganese deep sea nodules are reduced with cuprous ions ($CU^+$) in an aqueous ammoniacal ammonium carbonate solution. The cuprous ions reduce the manganese in the nodules which enables metal values such as copper, nickel, cobalt and molybdenum to be dissolved while leaving undesirable metals such as iron in the solid residue. In the reduction process, the manganese dioxide in the deep sea nodules is reduced by cuprous ion to manganese carbonate according to the reaction:

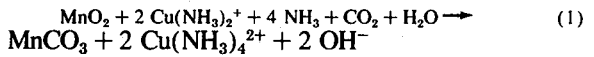

$$MnO_2 + 2\ Cu(NH_3)_2^+ + 4\ NH_3 + CO_2 + H_2O \longrightarrow$$
$$MnCO_3 + 2\ Cu(NH_3)_4^{2+} + 2\ OH^- \quad (1)$$

Cupric ions indicated in equation (1) are reduced back to the cuprous state with carbon monoxide according to the reaction:

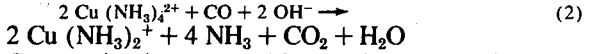

$$2\ Cu\ (NH_3)_4^{2+} + CO + 2\ OH^- \longrightarrow$$
$$2\ Cu\ (NH_3)_2^+ + 4\ NH_3 + CO_2 + H_2O \quad (2)$$

Cuprous ion is consumed in reaction (1) and is regenerated by reaction (2). The net overall reaction for the reduction process is the sum of equations (1) and (2), or equation (3):

$$MnO_2 + CO \longrightarrow MnCO_3 \quad (3)$$

There is an optimum temperature range for equations (1) and (2) which take place in the reaction vessels. That temperature range is 35°–55° C. The preferred operating temperature for each reaction vessel is approximately 55° C. To maintain the temperature within the foregoing range, heat is removed from the slurry which leaves each reactor.

In order to maintain the cuprous ion concentrations fairly high at all levels of the process, the nodule feed stock is injected at multiple points. This multipoint injection facilitates the regeneration of curpous ions by reducing the possibility that the nodules will exhaust the supply of cuprous ions by reacting with them.

Once the ore has been reduced, the metal values such as copper, nickel, cobalt and molybdenum are rendered leachable. However, the copper values are present in the reduced leach liquor as cuprous ions and in order to be extracted efficiently from the leach liquor by an oxime type extractant, must be oxidized to the cupric form. In accordance with the present invention, this is accomplished by diverting a small stream of fresh raw modules 6 from the reduction circuit to a reactor 8 in which the cuprous ions in the leach liquor are oxidized according to the reaction represented by equation (1) i.e.

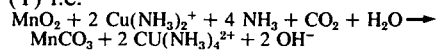

$$MnO_2 + 2\ Cu(NH_3)_2^+ + 4\ NH_3 + CO_2 + H_2O \longrightarrow$$
$$MnCO_3 + 2\ CU(NH_3)_4^{2+} + 2\ OH^-$$

The process of the present invention is further illustrated by the following example in conjunction with the drawing. At the outset, however, it is emphasized that the following description relates to a procedure that is formed in a pilot plant. By extrapolating the results obtained from the pilot plant, however, one skilled in this art can design a commercial plant for processing large quantities of nodules in accordance with the present invention.

The pilot plant was designed for one half tons per day nodule throughput, based on 3½ percent solid slurry and with up to a three hour hold-up in the reduction section.

The process performed in the pilot plant can be broken down in the following sections:
1. Ore Preparation
2. Reduction-Leach
3. Oxidation
4. Wash-Leach
5. LIX Separation of the Metals
6. Electrowinning

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter" technique before going into the primary crushing circuit. The primary crushing circuit consists of a Jacobson "Full Nelson" crusher to reduce the raw nodules to minus 1 inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill for final grinding. The rod mill reduces the nodules from a particle size of minus 6 mesh to a particle size of approximately minus 60 mesh. As the nodules enter the rod mill, they are wetted with a synthetic sea water which brings the nodules up to approximately 40% moisture. This moisture content corresponds to the moisture which would be present in nodules as they are brought up from the sea bottom. At this point, it should be noted that in a commercial operation the nodules would be processed directly after being mined from the ocean bottom, thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor to the rod mill. In a commercial process recycle liquor. can be added to the grinding mill in order to provide liquor to facilitate grinding and reduce the dust problem without introducing more water into the circuit which would cause undesirable dilution. Of course, the recycle reduction liquor is advantageous in maintaining the proper copper concentration in the reduction circuit as well to provide liquor which is useful in the grinding process itself. Details of the recycle liquor circuit are amplified below.

In accordance with the present invention a stream of raw nodules is diverted from the reduction circuit to the oxidation circuit. This diversion is amplified below in the section entitled OXIDATION.

REDUCTION-LEACH

The reduction-leach portion of the pilot plant is the location where the nodules are chemically reacted to make the metals of interest soluble in a strong ammoniacal ammonium carbonate solution. This accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant will not have to be shut down in the event that there is a malfunction in some piece of ore preparation machinery. After leaving the surge tank, a feed pump pumps the slurry to the reduction circuit.

The reduction circuit includes six reactors connected in series. These reactors are sixty gallon capacity reactors which are used to a 42 gallon capacity in the actual processing. Each reactor is formed of 316 stainless steel and is outfitted with agitators, pressure gages, level alarms, and gas sparging equipment.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unecessary in the process. Indeed, the only gas necessary for the process is carbon monoxide. The off gas coming out of the reactors first goes through condensers which remove some of the water in the gases before going to off gas rotometers which give an indication of the amount of gases coming out of a reactor. The off gases go through an ammonia scrubber and are exited to the atmosphere.

The reactors themselves are outfitted with gravity overflows so that there is a cascading system from the first through the sixth reactor.

In one important embodiment of the multipoint injection system, each of the first four reactors is fed an equal amount of feed stock. That is, 25 percent of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others. It has been found advantageous, however, that there be no nodule injection into at least the last reactor. That is, each portion of nodules should pass through two stages in progression; therefore, there should be no nodule injection in the last stage. It should be noted that in the pilot plant process there is no nodule injection in the last two stages. Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. The slurry in the fifth and sixth reactors is approximately 3.5 percent solids and the average residence time in the system is twenty minutes per stage. The slurry overflowing the last reactor is flocculated to enhance settling before entering a clarifier. The clarifier is used to separate the liquid from the solids.

The reduction-leach circuit also includes a gas metering system. As set forth above, the reducing gas is 95 percent carbon monoxide and 5 percent hydrogen. It has also been found advantageous to include a 1 percent methane tracer in the reducing gas. The methane was used as an aid in establishing material balances. The reducing gas is fed from portable cylinders through a pressure reducing valve and a gas totalizer. The gases are metered individually to each of the six reactors as required to maintain the cuprous ion within various control ranges. The gases are also sampled by gas chromatographs.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and approximately 15 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for start-up as set forth above, the manganese nodules are added to the first four reactors. The total rate of feed to the four reactors is about 30 pounds per hour of nodules. As the nodules are being fed into the reactors, carbon monoxide is sparged through the bottom of the reactors at a total rate of about 70 standard cubic feet per hour. At this point, it should be noted that the amount of carbon monoxide that is fed into each stage of the reactor is controlled by the cuprous ion concentration of the contents of any given reactor. This is determined by analyzing the contents of the reactor periodically. During start-up, this is done every half hour and is continued once an hour while the process is in the steady state stage.

Approximately 120 gallons per hour of reduction slurry enters the clarifier. The solids leave the bottom of the clarifier in the form of a slurry with approximately a 40 percent solids content. The overflow from the clarifier is clear liquid which constitutes the recycle reduction liquir. However, after leaving the clarifier, the recycle reduction liquor enters a surge tank whereupon it is passed into an ammonia makeup unit. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger into the first reactor and the grinding mill. The heat exchanger removes heat that was generated in process.

In accordance with the present invention, heat exchangers are positioned in the flow path of the slurry leaving each reactor. These heat exchangers are shell and tube heat exchangers. In this type of heat exchanger, the slurry passes through a tube and a water coolant flows through the shell surrounding the tube counter to the flow of the slurry. Heat is removed from the slurry so that the temperature in any reaction vessel is between the range of 35°–55° C.

One advantage of operating the reduction reactor within the range of 35°–55° C is an improved nickel and cobalt solubilization. For example, a test showed that for reactorsoperated at 65° C, a pH of 10.8, 120 g/l $NH_3$ and a $CO_2/NH_3$ ratio of 1.5, nickel solubilization was minus (−) 19.3% and cobalt solubilization was minus (−) 121%. The minus value indicates that nickel and cobalt in the recycle liquor goes into the solids phase. When the temperature was decreased to 50° C with other parameters held constant, the nickel solubility was increased to 88% and the CO solubility was increased to 77.8%. The lower temperature did not greatly affect copper solubilization.

A small stream of basic metal carbonate (BMC) containing primarily copper and nickel carbonate can also be recycled to the first stage if required to maintain the total copper in the reduction system at an acceptable level. This stream of basic metal carbonate compensates for unsolubilized copper leaving the reduction loop in the clarifier underflow. Details of the BMC recycle are amplified below.

OXIDATION

In the oxidation circuit, the clarifier underflow is combined with second stage wash liquor and the resulting slurry is oxidized with fresh nodules to convert the cuprous ion in the clarifier underflow to cupric ion to facilitate further processing. If necessary, air may also be used in a subsequent step to complete oxidation of the slurry. The amount of nodules diverted from the reduction circuit to the oxidation reactor 8, varies according to the amount of oxidation required and whether or not air is used as an oxidant in a subsequent step. If no air is used for the system described above approximately 2% by wt of the slurry leaving the rod mill is diverted along route 6 to the oxidation circuit.

Experiments were conducted to determine the efficiency of raw nodules in oxidizing leach solutions.

| % Stoichiometric Nodules Added | Temp ° C | Cu(ammine$^+$ Conc. (gm/l) Initial | Final | % Nodule Utilization* |
|---|---|---|---|---|
| 50% Excess | 60 | 3.4 | 0.2 | 62.7 |
| 10% Excess | 60 | 3.5 | 0.8 | 79.2 |
| 25% Deficiency | 60 | 4.0 | 1.35 | 88.3 |

*Equivalent to conversion of $Mn^{4+}$ to $Mn^{2-}$

The results show that the magnanese nodules successfully oxidized the Cu(ammine)$^+$ ion.

In separate experiments, fresh nodules were added to cuprion solutions in the absence of reduced solids. The reaction was allowed to proceed for one hour. The solids were then removed and throughly washed with a 6M ammoniacal solution. Result are tabulated below:

| % Stoichiometric Nodules added | Temp ° C | Cu(ammine)$^+$ Initial | Final | %Nodule Utilization | % Extraction Ni | Cu |
|---|---|---|---|---|---|---|
| 10% Excess | 60 | 4.2 | 0.9 | 80.5 | 56 | 28 |
| 25% Deficiency | 50 | 8.8 | 2.86 | 90 | 76 | 58 |

The results show that the nodules successfully oxidized the Cu(ammine)$^+$ while simultaneously being leached of meal values.

WASH CIRCUIT

The oxidized slurry is pumped to a countercurrent decantation system (CCD) consisting of seven stages of counter-current current washing units. The wash-leach steps are carried out on a batch basis in nine tanks. It should be noted that in the pilot plant nine stages are used to simulate a countercurrent wash system. Although this system is not truly a countercurrent, it has been able to demonstrate that a seven reactor countercurrent system is advantageous. The two extra units used in the pilot plant are necessary because one unit is either being filled or is being emptied. In the wash-leach system, the metal solubilization is completed as the displacement wash process is carried out. Fresh wash liquor is added to the seventh stage of the system as a solution containing 100 grams per liter ammonia and 100 grams per liter carbon dioxide. Liquor is transferred fron one tank of the settled slurry every 12 hours to another appropriate tank in the system to affect the countercurrent washing. The carbon dioxide concentration varies throughout the washing system and exits in the pregnant liquor which contains approximately 65 grams per liter $CO_2$. This decrease in $CO_2$ concentration is due to the fact that the slurry entering the oxidation and the wash-leach circuit has a liquor phase which contains only 25 grams per liter $CO_2$. Pregnant liquor, containing the metal to be recovered, is decanted from the first wash stage and pumped to a surge tank. Fresh ammonia solution without metals is added to the last solids wash stage. The metal values in solution range from approximately 0 in the fresh wash liquor to between 4 – 8 grams per liter copper and 5 – 10 grams per liter nickel in the pregnant liquor. Of course, other metal values are also present in the pregnant liquor but nickel and copper are the major metal values of interest.

After the wash-leach step, the pregnant metal bearing liquor is piped off for further processing as is explained below. The second stage wash is recycled back to the oxidation reactor. The tailings, which are nothing more than reduced nodules washed of most of their non-ferrous metal values and with the manganese converted to manganese carbonate, are sent to a surge tank (not shown). From the surge tank, they are then pumped to a steam stripping operation where the ammonia and $CO_2$ are driven off. The tailings are then drummed. The ammonia and $CO_2$ obtained in the steam stripper may be recycled.

BMC RECYCLE

A portion of the pregnant liquor from the oxidation and wash-leach circuit is steam stripped on a batch basis to remove ammonia and carbon dioxide and to precipitate the basic metal carbonates. The precipitated basic metal carbonates are dissolved in an aqueous solution containing approximately 60 g/l $NH_3$ and 60 g/l $CO_2$. This BMC feed is pumped to the first stage of the reduction circut.

LIQUID ION EXCHANGE SEPARATION

The pregnant liquor contains various metal values including, copper, nickel, cobalt and molybdenum. In the liquid ion exchange separation circuit, the object is to separate the copper, nickel, cobalt and molybdenum from each other and from the pregnant liquor. Initially, the copper and nickel are coextracted by an organic extractant in a series of mixer/settler units. The organic extractant is LIX-64N in a kerosene base. LIX-64N is an extractant sold by General Mills Chemicals, Inc.

The copper and nickel free liquor (raffinate) is sent to a storage tank before it is steam stripped.

The organic extractant which contains copper and nickel values is washed with an $NH_4$ $HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molbydenum is recycled back to the process as fresh wash liquor. Ammonia and $CO_2$ are added to the solution to bring it up to the prescribed concentration. For further details of a liquid ion exchange procedure which can be employed, see U.S. Pat. No. 3,853,725 entitled Selective Stripping Process by Roald R. Skarbo, filed June 18, 1972, the teachings of which are incorporated herein by reference.

ELECTROWINNING

Metal recovery is accomplished by electrowinning copper and nickel from the solution prepared in the LIX plant as described above. This process is performed on a batch basis for the copper recovery and on a continuous basis for the nickel recovery in a separate plant. The metal containing solutions are transferred once a day.

Figure 2:
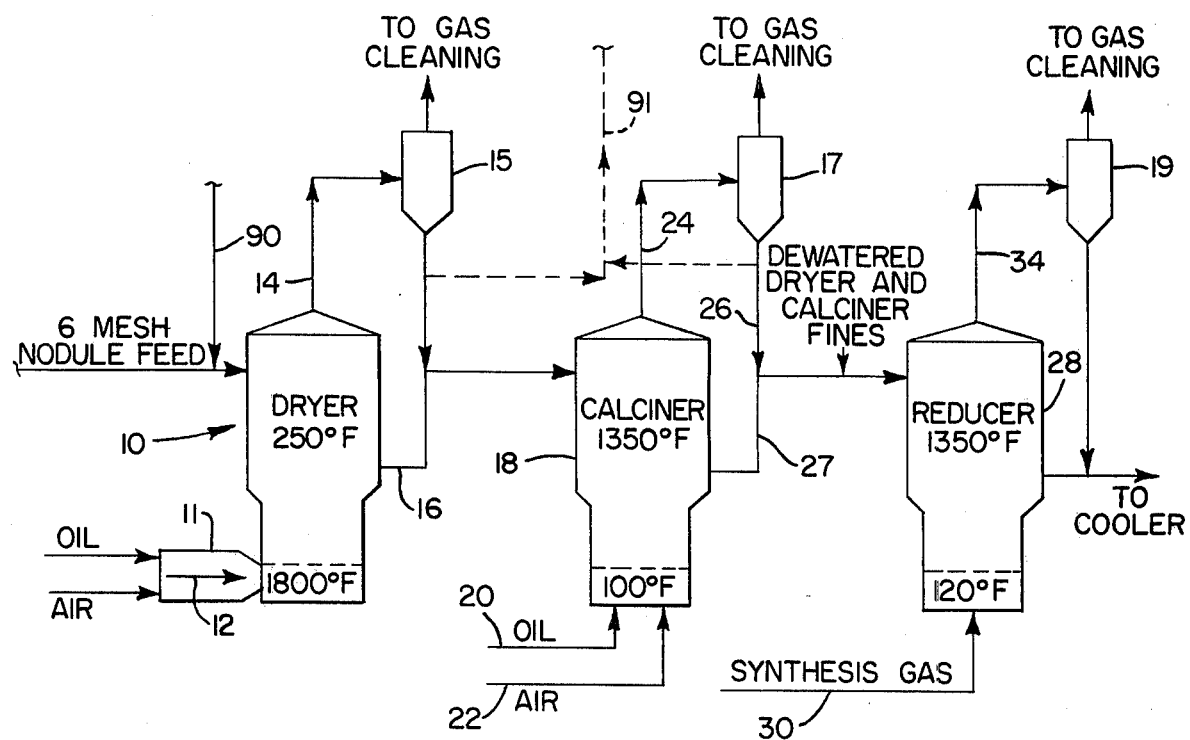

The fluid bed embodiment of the process of the present invention is shown schematically in FIGS. 2 et seq.

Nodules as received from the ocean floor are physically dewatered and prepared for processing by first grinding to 6 mesh (U.S. Sieve size). The ore, containing approximately 30% free water and 10% combined (bound) water, is then dried in fluid bed dryer 10 at 250° F. Hot fluidizing gas 12 enters from the bottom 11 of dryer 10 and exits at the top of the dryer as is shown by arrow 14. Product is discharged partly as underflow 16 which proceeds to calciner 18 and partly as carry-over in the off gases represented by arrow 14. After leaving the dryer, the fluidizing gas containing entrained solids enters cyclone 15 where solids are separated and are combined with stream 16 entering calciner 18. The offgas from cyclone 15 is sent to a gas cleaning circuit. Fines are recovered in a gas scrubber system and the fines are separated by a solid liquid separation.

The dryer product has a total moisture content of about 18%, most of which is combined water. The material may be stored in a surge bin for introduction at the proper rate into a calciner 18.

In calciner 18, the dryer product is calcined at 1350° F to remove the remaining free and combined water. In addition, the calciner 18 readily decomposes the manganese dioxide according to the reaction.

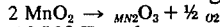
$2 MnO_2 \rightarrow Mn_2O_3 + \frac{1}{2} O_2$

At 1350° F and oxygen partial pressure of 0 to 0.07 atm., about 60% of the $MN_2O_3$ is converted to $MN_3O_4$. In the process of the present invention, the $MnO_2$ is converted to intermediate oxides. Such oxides include $MN_2O_3$, $Mn_3O_4$ and $Mn_5O_8$. It is not certain as to which of these intermediate oxides predominate.

The required heat for calcination is provided by directly injecting and combusting Bunker C fuel oil 20 in the fluid bed using sufficient air 22 to maintain an oxygen content of approimately 6% by weight in the stack gases 24. This level of oxygen is recommended to insure efficient combustion of oil with minimum carbon formation. Other fuels such as natural gas can be used for this step. As was the case with dryer 10, the carryover in the stack gases 24 is removed when the offgas is passed through cyclone 17 and a scrubber for recovery of fines. The separated solid carryover 26 is then added to the hot calcined underflow 27 which flows to the fluid bed reducer 28. Dewatered dryer and calcined fines are also added to reducer 28.

In the reducer 28, the intermediate manganese oxides are reduced at 1350° F to MnO and the Cu, Ni and Co oxides are reduced to their elemental states. It is emphasized that the terminal manganese reduction product below about 2000° F is MnO. The gas 30 for fluidization and reduction is synthesis gas which analyzes about 42.0% CO, 37.7% $H_2$, 12.3% $N_2$, 5.7% $H_2O$ and 2.2% $CO_2$. Of course, other gases such as hydrogen can be used in this step. The gas may be generated in a synthesis gas plant by partial oxidation of Bunker C fuel oil using oxygen enriched air (60% $O_2$). Other fuels such as natural gas or coal can be used for reducing gas production. The gas is scrubbed to remove particulate carbon and is delivered cold (120° F) to the reactor windbox.

The reduction reactions in the reducer 28 are exothermic and, therefore, provide the source of heat the gas 30. At this point, it should be noted that the reduction temperature is an important parameter in the process. At temperatures above 1350° F, nickel recovery is affected, that is when the nodules are subjected to temperatures above 1350° F; leachability of the nickel from ore becomes more difficult. If exothermal heat exceeds that necessary for the reduction stage then some means of utilizing the excess heat can be included in the process. This can be accomplished by by-passing a portion of the dryer product directly to the reducer. Alternatively, the reducer may be permitted to operate at temperatures of 200° F in excess of the calciner. The preferred alternative to accomplish the heat balance, however, is to forward scrubber fines from the dryer and calciner directly to the reducer.

Once again the reducer carryover fines in the offgas 34 are captured by a cyclone 19. The cyclone offgas goes to wet scrubbing and the remaining fines are subsequently recovered. The reduced calcine leaves the reducer 28 proceeds to a cooler 60 where the temperature is dminished to 500° F in a fluid bed using nitrogen as the fluidizing gas (see FIG. 3). The cooler 60 contains coils 62 in which water is converted to steam thereby lowering the temperature of the reduced ore from 1350° to 500° F. The cooler offgas is cleaned through a cyclone (not shown) followed by a scrubber 64 and is recycled back to the cooler 60. After the cooler, the nodules have been treated sufficiently to enable the metal values to be leached.

Figure 3:
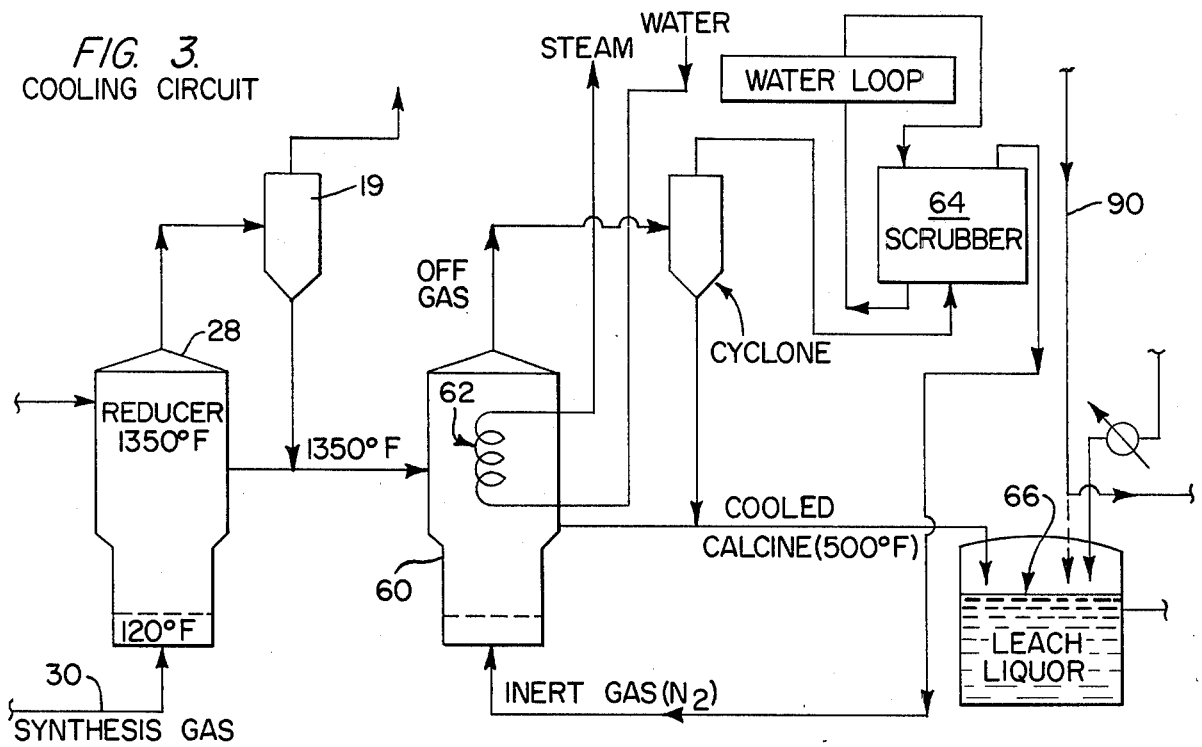

As is shown in FIG. 3, the cooled reduced calcine is quenched in leached liquor 66.

The reduced nodule calcine consists principally of manganous oxide and manganous silicate containing metallic copper, nickel and cobalt with iron present as metal or oxide or a mixture of both. During leaching with ammoniacal ammonium carbonate, the manganous oxide is converted to manganous carbonate through the formation of a soluble intermediate, a manganese amine. The metals are oxidized: Cu, Ni and Co forming soluble ammine complexes and iron converted to ferric hydroxide. Cupric copper is the main oxidant in the leach liquor which is reduced to cuprous copper. In leach liquor 66 the following reaction occurs:

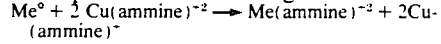

In order to extract the copper values, the cuprous copper must be oxidized back to cupric copper. This is accomplished in leach tank 69 with manganese nodules by the reaction set forth in equation (1). Thus, when leaching calcine with pregnant liquor, the effect of available oxygen upon the leach rate may be small. Experiments were thus carried out in which air, argon and oxygen were bubbled through real pregnant liquor before and during leaching. Readings of dissolved oxygen using a Weston and Stack dissolved oxygen meter were 1.5, 6.5 and above 15 ppm in argon, air and oxygen treated liquors, respectively. Air was not excluded entirely from the argon and oxygen experiments as the stirring action could introduce air to the solution. The results show virtually no difference in leach rates under the three conditions. The cobalt extractions were negative in all cases; no improvement was noticed with oxygen sparging. The extraction figures with argon bubbling are slightly higher. As a result of the foregoing, a conclusion was made that the bulk of the oxidation of the metals (and thus the bulk of the leaching) can be carried out by the cupric ions.

After being quenched with leach liquor, the treated nodules are ground to −35 mesh and passed into leach tanks 69, 70 and 71 for the first stage leach.

During the first stage leach the metal values are oxidized with fresh nodules which are introduced along route 90 into tank 69. Air may be also introduced into tank 71 if needed to assist the raw nodules in oxidizing the reduced slurry.

As is shown in FIG. 3 raw nodules may also be introduced into the leach liquor 66. Introducing the fresh nodules into the leach liquor 66 results in a longer residence time for the reaction between fresh nodules and cuprous ions.

Theoretically, an amount of fresh nodules approximately equal to 10% of the weight of the total nodules fed to dryer 10 should be reduced by the reduced calcine. This amount of fresh nodules converts nearly all the curpous ions to cupric according to the reaction as shown by equation (1) above. Any remaining cuprous ions will be converted to cupric ions by air oxidation which occurs in tank 71. Thus, in the preferred embodiment of the invention, approximately 10% by wt. of the feed into dryer 10 is diverted to leach tank 69.

Figure 4:
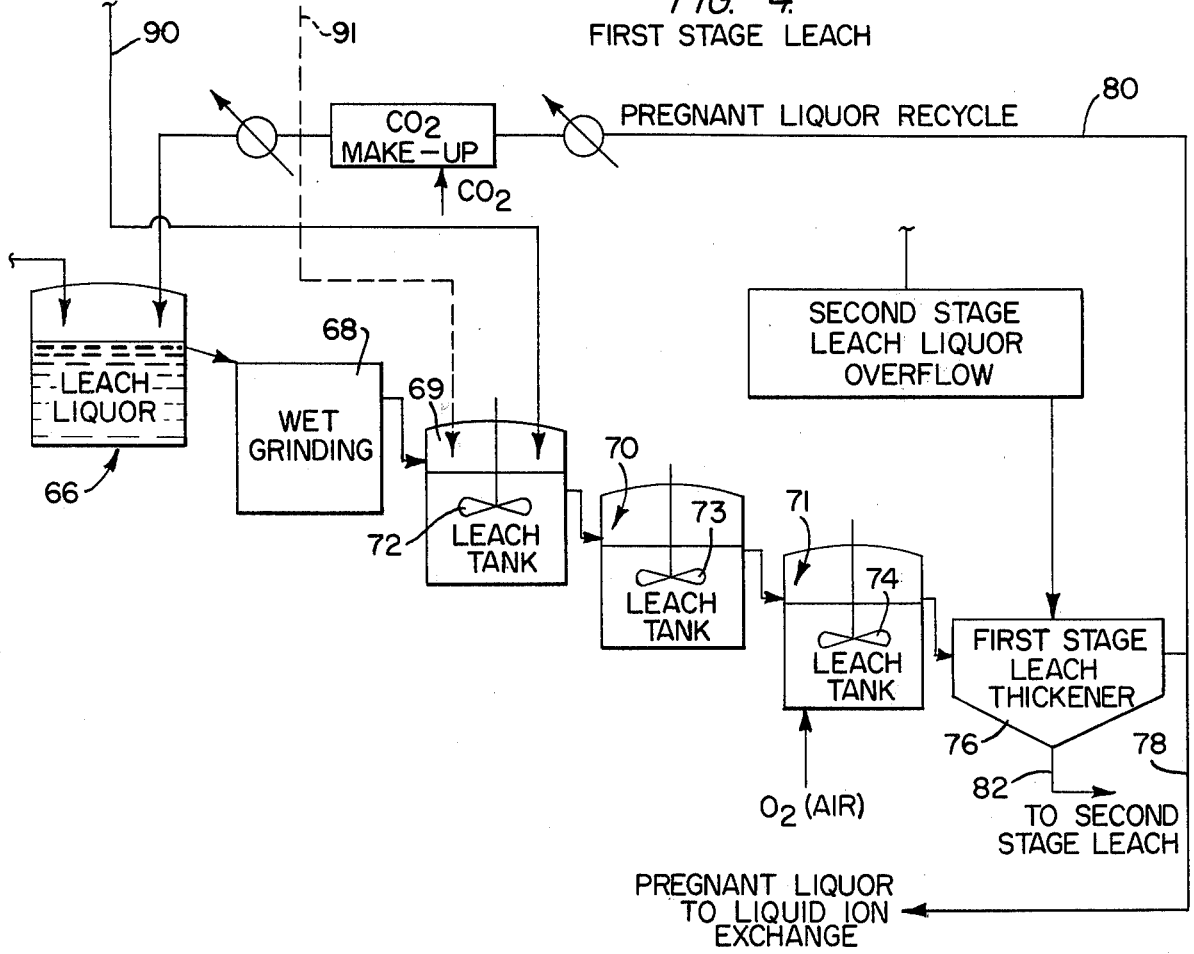

A practical application of the invention includes use of the fines from the dryer cycle 15 and/or the calciner cyclone 17 in lieu of fresh (raw) nodules. In this alternate, the troublesome fines are minimized in the dryer 10, calciner 18 and reducer 28 fluid beds and made use of in the subsequent leach steps. Furthermore, because of their fineness, these solids are more reactive in the leach step. As is shown in FIG. 2 and 4 these fines may be introduced into tank 69 along route 91.

After separating the liquid and the solids, the solids are leached in the second stage. Stream 78 of the pregnant liquor is cycled to ion exchange extraction for recovery of metal values.

As is shown in FIG. 5, the solids from the first stage leach are passed to a second stage leach and are oxidized with air, if needed, in tanks 83, 84 and 85.

DETAILS

Not only do the fresh nodules oxidize the cuprous ions to cupric ions; but also, the raw nodules themselves become reduced which enables their metal values to be leached. Cobalt is also converted from the +2 valance state to the +3 valance state. Cobalt in the +3 state will not be extracted by oximes; whereas, cobalt in the +2 state will be extracted by oximes.

The foregoing constitutes a general overall discussion of the fluid bed process including the use of raw nodules as an oxidizing agent. A more detailed description of the process of the present invention follows.

The nodule ore input to a plant consists of 200 short tons per hour (TPH) of wet manganese nodules. Ore feed preparation consists of size reduction of the nodules to minus 6 mesh by use of single and double cage mills. The prepared ore feed which contains approximately 30 free moisture and 10% combined moisture is dried in a dryer at a fluid bed temperature of 250° F. The product from the dryer has a total moisture content of about 18%, most of which is the combined moisture in the nodules. The dryer product, about 143 TPH is stored in a surge bin of about 500 tons capacity to provide approximately 4 hours of ore feed supply. Each 397,003 lbs per hour of feed entering the dryer includes 239,000 lbs per hour of solids, 39,000 lbs per hour of combined water and 119,000 lbs per hour of free water. In order to process the foregoing amount of nodule feed, 9,384 lbs per hour of oil are mixed with 330,933 lbs per hour of air in the dryer. The space velocity within the dryer is 8 feet per second, 444,808 lbs per hour of offgas leave the dryer. The nodules are retained in the dryer for approximately 7 minutes before being forwarded to the calciner. The product distribution from the dryer is as follows:

| Underflow | 74.4% |
|---|---|
| Primary cyclone | 23.1% |
| Secondary cyclone | 2.0% |
| Scrubber fines | 0.5% |

The nodules entered the dryer containing 29% free water content and exits with about 8% free water content. Total bound and free are water at the exit of the dryer is about 13%.

After leaving the dryer, approximately 292,875 lbs per hour of dryer product is introduced into the fluid bed calciner. The operation in the calciner is the calcination of the dry manganese nodules to remove the remaining free and combined water, to decompose the manganese oxides to lower oxides, and to preheat the ore for the next processing step. This calcination operation is carried out in a fluid bed calciner at a fluid bed temperature of 1350° F and at a space velocity of about 4 feet per second. The required heat is supplied by injection and combustion of Bunker-C oil directly in the fluid bed. In the calcination operation, the $MnO_2$ in the nodules will react to form principally $Mn_2O_3$ and $O_2$ $$(2MnO_2 + \text{heat} \rightarrow Mn_2O_3 + \frac{1}{2} O_2)$$

About 60% of the $Mn_2O_3$ is also converted to $Mn_3O_4$. The heat required for calcination is provided by injecting and combusting Bunker-C oil in the fluid bed using sufficient air to maintain an oxygen content of approximately 6% weight in the offgases. The average material retention time in the calciner is about 3 hours. Direct fuel injection of the Bunker-C fuel oil provides all the heat necessary for the reaction. The space velocity of the gas is 4 feet per second. To maintain the temperature within the calciner approximately 18,200 lbs per hour of Bunker-C oil are mixed with 319,412 lbs per hour of air.

The total water content is reduced in the calciner from 13% by weight to 6% by weight. The product distribution from the calciner is given in the following table:

| Underflow | 47.6% |
|---|---|
| Primary cyclone | 46.1% |
| Secondary cyclone | 4.6% |
| Scrubber fines | 1.7% |

Available oxygen is reduced in the calciner from 11.9 weight percent in the feed to 9.3 weight percent in the underflow. The slight oxidizing atmosphere maintained by injecting sufficient air to allow 6% oxygen in the offgas, allowed good gasification and resulted in a carbon content of only 0.02 weight percent in the product.

The hot calcined ore from the calciner flows by gravity to a fluid bed reducer. Centrifuge cake from calciner and dryer scrubbers is also added to the ore reducer. Slight changes in centrifuge cake moisture, calciner bed operating temperature and reducing gas temperature can be used as a means for controlling reduction bed temperature.

The ore reduction is carried out in a fluid bed reducer operating at 1350° F and at a space velocity of about 4 feet per second. Gas for fluidization and reduction is generated from Bunker-C oil and has an analyses of about 5.7% $H_2O$, 42% CO, 37.8% $H_2$, 2.2% $CO_2$ and 12.3% $N_2$ (% by volume). This gas is a cool clean gas which is delivered to the reducer windbox at about 120° F. The exhaust gas from the reducer goes to a cyclone dust collecting system and then a wet gas scrubber-cooler.

The fine reduced fractions discharged as cyclone product is collected in a seal tank for subsequent transfer to the cooler. In the reducer the $Mn_2O_3$ in the hot calcined ore is reduced to MnO. Higher oxides of Mn in the centrifuge cake are also reduced to MnO by $H_2$ and CO in reducer gas. Reduction bed temperature is controlled as above and by addition of small amounts of bed spray water.

Approximately 38,667 lbs per hour of synthesis gas are introduced into the reducer. The space velocity in the reducer is 4 feet per second.

The scrubber offgas exits at the rate of approximately 50,320 lbs per hour. In the reducer, the higher oxides of manganese are reduced to MnO. The $Fe_2O_3$ is coverted to $Fe_3O_4$ and the base metal oxides are reduced to their elemental forms (CuO → Cu). Approximately 211,007 tons per hour of reduced product are removed from the reducer.

The temperature of the bed is held at 1350° F. while the material residence time averages 1 hour. Available oxygen is reduced from 9.6 to 2.8% by weight in the underflow.

As is shown in FIG. 3, the reduced ore leaving cooler 60 is quenched in ammonia-ammonium carbonate leach liquor 66 solution. Extractions of 90% copper and 90% nickel are possible with liquor 66 containing 100 g/1 $NH_3$ and 60 g/1 $CO_2$. Thus, the cooled calcine from reduced ore cooler 60 discharges directly into a quench tank 66 where it is quenched with $CO_2$ - rich recycle leach solution. The tank 66 is covered and provided with facilities for the introduction of inert gas if such anti-oxidation is needed.

The system is designed to handle a calcine output of 106 tons per hour from the cooler 60.

The reduced calcine contains about 40% manganese. Some 70% of this manganese is expected to be converted to manganese carbonate when the calcine is mixed with the ammonia/carbon dioxide leach solution. Since the manganese carbonation reaction proceeds fairly rapidly, it is desirable to have all the carbon dioxide required available in the recycle leach solution used for quenching.

Calcine particle size is expected to be 100% passing 6 to 10 Tyler mesh. It has been established that good metal extractions can be obtained if the calcine particle size is reduced to 100% passing 35 Tyler mesh. A grinding circuit 68 is provided to accomplish the foregoing (see FIG. 4).

Grinding is carried out in a pebble mill. Granite or flint pebbles are used as grinding media.

The operating pebble mill functions in closed circuit with a bank of rubber-lined cyclones (not shown). These cyclones are sized to give a 35 Tyler mesh separation with feed and underflow densities of 23 and 50% solids by weight respectively.

The ground calcine is leached, in two, countercurrent stages, using a lixiviant containing 100 grams per liter of ammonia and 65 grams per liter of carbon dioxide with fresh nodules and air as an oxidant.

The overflow from the cylones flows, to the first stage leach, which is carried out in three tanks 69, 70, 71 operating in series. These tanks are sized to give a retention time of one hour with a pulp density of just under 10% solids. The pulps are held in suspension by multiple-bladed, turbine-type impellers 72, 73, 74. The impellers also serve to improve contact between reduced and fresh nodules and to disperse the air which may be introduced into each of the tanks below the impeller blades. With 200 TPH of fresh wet nodules going into dryer 10, 20 TPH of fresh wet nodules are fed into leach tank 69.

The leached pulp flows by gravity from the third tank 71 to a thickener 76 for separation of the solids and liquid. The thickener overflow (leach) solution contains 18.2 grams per liter of metals from the reduced calcine and 1.8 grams per liter metals from the raw nodules. The overflow 78 (the pregnant solution) is sent to metal recovery; a portion 80 is recycled to the carbon dioxide absorption and quenching operations. The solids 82 is withdrawn from the bottom of the thickener 76 as a pulp containing 45% solid, and pumped to the second stage leach.

The feed to the second stage leach (see FIG. 5) consists of the underflow pulp from the first leach thickener 76, the overflow from the first wash thickener, and sufficient recycle second leach solution to give a pulp density of 16% solids. The leach is carried out in three tanks 83, 84, 85 which are sized to give a retention time of one hour. The pulps are held in suspension by multiple-bladed, turbine-type impellers. The impellers also serve to disperse additional oxidation air which is introduced into each tank below the impeller blade.

The pulp discharged from the second leach is pumped to a second thickener 86 for solids-liquid separation. Part of the thickener overflow is recycled to the leach, and the balance joins the first leach solution going to carbon dioxide absorption. The thickener underflow is pumped at 45% solids to the washing circuit.

The pregnant solution overflowed from the first thickener contains some 50 parts per million of very fine solids. These solids must be removed before the pregnant enters solvent extraction because they will cause "crud" formation. The solids are removed by passing the pregnant through pressurized upflow sand filters. The clarified pregnant contains less than 1 part per million of solids.

The underflow from the second leach thickener is washed for metals recovery in a conventional, 5 stage countercurrent - decantation (CCD) thickener circuit (see FIG. 6). In order to ensure good diffusion of the wash solutions into the pores of the coarser solids particles, provision is made for pre-mixing the feed to each thickener in an agitated tank. The wash liquor contains 100 g/1 $NH_3$ and 65 g/1 $CO_2$.

Material balances for the drying, calcining reducing and oxidizing steps of the process are set forth in Tables A, B and C below:

TABLE A

| COMPONENT | STREAM lbs/hr | Raw Nodules | Air to Dryer | Oil to Dryer | Dryer Off Gas | Scrubber Off Gas | Dried Nodules |
|---|---|---|---|---|---|---|---|
| Solids | | 239,000 | | | | | 239,000 |
| $H_2O$ (Comb.) | | 39,000 | | | | | 39,000 |
| $H_2O$ (Free) | | 119,000 | | | 112,067 | 16,800 | 14,667 |
| $O_2$ | | | 77,600 | | 48,775 | 48,775 | |
| $N_2$ | | | 253,333 | | 253,333 | 253,333 | |
| $CO_2$ | | | | | 30,000 | 30,000 | |
| $H_2$ | | | | | | | |
| Fuel | | | | 9,067 | | | |
| S | | | | 317 | | | 158 |
| $SO_2$ | | | | | 633 | 633 | |
| Total | | 397,033 | 330,933 | 9,384 | 444,808 | 349,541 | 292,825 |
| M.W. (molecular wt.) | | | 29 | | 25.4 | 28.6 | |
| S.C.F.H. | | | 4,324,893 | | 6,628,467 | 4,630,000 | |
| % Solids | | 70 | | | | | 95 |
| ° F | | AMB. | AMB. | 200 | 220 | 110 | |

TABLE B

| COMPONENT | STREAM lbs/hr | Calciner Feed | Air to Calciner | Calcining Oil to Calciner | Calciner Off Gas | Scrubber Off Gas | Gas to $CO_2$ abs. | Calciner Product |
|---|---|---|---|---|---|---|---|---|
| Solids | | 239,000 | | | | | | 228,207 |
| $H_2O$ (Comb.) | | 39,000 | | | | | | |
| $H_2O$ (Free) | | 14,667 | | | 68,773 | 13,410 | 3,450 | |
| $O_2$ | | | 73,442 | | 30,727 | 30,727 | 8,100 | |
| $N_2$ | | | 245,970 | | 245,970 | 245,970 | 64,000 | |
| $CO_2$ | | | | | 55,553 | 55,553 | 14,607 | |
| $H_2$ | | | | | | | | |
| Fuel | | | | 17,597 | | | | |
| S | | 158 | | 603 | | | | |
| $SO_2$ | | | | | 1,207 | 1,207 | | |
| Total | | 292,825 | 319,412 | 18,200 | 402,230 | 346,867 | 90,157 | 228,207 |
| M.W. | | | 29 | | 27.0 | 29.5 | 29.1 | |
| S.C.F.H. | | | 4,181,000 | | 5,636,000 | 4,468,400 | 1,176,253 | |
| % Solids | | 95 | | | | | | 100 |
| °F | | 180 | AMB. | 190 | 1,250 | 110 | 110 | 1,350 |

TABLE C

| COMPONENT | STREAM lbs/hr | Reducer Feed | Reducing Gas | Scrubber Off Gas | Reducer Product |
|---|---|---|---|---|---|
| Solids | | 228,207 | | | 211,007 |
| $H_2O$ (Comb.) | | | | | |
| $H_2O$ (Free) | | | 2,207 | 3,620 | |
| $O_2$ | | | | | |
| $N_2$ | | | 7,433 | 7,433 | |
| $CO_2$ | | | 2,100 | 32,970 | |
| CO | | | 25,283 | 5,750 | |
| $H_2$ | | | 1,643 | 727 | |
| Fuel | | | | | |
| S | | | | | |
| $SO_2$ | | | | | |
| Total | | 228,207 | 38,667 | 50,320 | 211,007 |
| M.W. | | | | | |
| S.C.F.H. | | | | | |
| % Solids | | 100 | | | 100 |
| °F | | 1,350 | 170–150 | 110 | 1,350 |

The pregnant liquor 78 (see FIG. 4) contains various metal values including copper, nickel, cobalt and molybdenum. In the liquid ion exchange separation circuit (not shown), the object is to separate the copper, nickel, cobalt and molybdenum from each other and from the pregnant liquor. Initially, the copper and nickel are coextracted by an organic extractant in a series of mixer/settler units. The organic extractant is LIX-64N in a kerosene base. LIX-64N is an extractant sold by General Mills Chemicals, Inc.

The copper and nickel free liquor (raffinate) is sent to a storage tank before it is steam stripped.

The organic extractant which contains copper and nickel values is washed with an $NH_4HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molybdenum is recycled back to the process as fresh wash liquor. Ammonia and $CO_2$ are added to the solution to bring it up to the prescribed concentration. For further details of a liquid ion exchange procedure which can be employed see U.S. Pat. No. 3,853,725 entitled "Selective Stripping Process" by Roald R. Skarbo, filed June 28, 1972, the teachings of which are incorporated herein by reference.

Metal recovery is accomplished by electrowinning copper and nickel from the solutions prepared in the LIX plant as described above. The process is performed on a batch basis for the copper recovery and on a continuous bases for the nickel recovery in a separate plant. The metal containing solutions are transferred once a day.

OXIDATION TESTS

In order to demonstrate that fresh nodules oxidize the cuprous ions in the reduced slurry, various control experiments were performed. The results of the experiments are discussed below.

Thermally reduced manganese nodules were leached of their metal values in ammonia-ammonium carbonate leach solution under oxidizing conditions. In this example, manganese nodules were reduced with a mixture of CO and $H_2$ at 1350° F in a fluid bed reactor. The reduced solids were cooled in an inert atmosphere, then mixed with fresh nodules in a nitrogen glove bag. The mixture of reduced and fresh nodules was ground in an inert atmosphere and transferred to an ammonia-ammonium carbonate leach solution containing approximately 10 gms/1 each of copper and nickel and in a stopped container for 24 hours at a liquid-solid ratio of 20:1. Solids were then washed with dilute ammonia to stop further leaching and were then analyzed.

Results of four separate experiments were compared with a control sample to which no fresh nodules was added:

| Wt.% Total Solids as Fresh Nodules | % Extraction Cu | Ni | Co | $Mn^{4+}$ % of Dry Solids after Leaching |
|---|---|---|---|---|
| 10 | 77.4 | 79.2 | 44.4 | |
| 10 | 64.9 | 79.6 | 31.4 | 0.48 |
| 5 | 76.7 | 81.5 | 47.2 | |
| 5 | 67.5 | 86.7 | 41.4 | 0.0 |
| 0 (control) | 71.5 | 82.2 | 45.7 | |

The control experiments contained enough oxidant in the form of $Cu(ammine)^{++}$ to leach the reduced nodules as shown. In those cases where fresh nodules were added, oxidation of the reduced nodules is shown by the disappearance of $Mn^{4+}$ which makes up 30% of the fresh nodules fraction. Leaching of the reduced/fresh nodule mixture reached the same level as in the control experiment showing that the fresh nodules were simultaneously leached.

From the foregoing it is apparent that utilizing raw manganese nodules as an oxidizing agent has many advantages. One significant advantage is that the nodules that are used as an oxidizing agent become reduced which renders its metal values leachable without the use of a consumable reducing agent. Two embodiments of the invention have been disclosed; in one embodiment cuprous ions remaining in the cuprion process after leaving the reduction circuit are oxidized to cupric ions so that they can be extracted more easily. In the fluid bed embodiment of the invention, cuprous ions are also oxidized to cupric ions with raw manganese nodules. Of course, it is also possible to use manganese nodules to oxidize reduced metals in other pyrometallurgical processes in which reduced metals are produced and must be oxidized prior to recovery.

Thus the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for treating a manganese ore containing copper and nickel base metal values to enable the copper and nickel base metal values in the ore to be recovered comprising the steps of calcining the ore to convert the $MnO_2$ to intermediate oxides of manganese, reducing the calcined ore to convert the intermediate oxide of manganese to MnO, leaching the reduced ore with an ammoniacal-ammonium carbonate leach solution to produce a leach solution containing copper and nickel metal values, and oxidizing metal values in the leach solution with raw manganese nodules to convert metal values in the leach solution to a higher oxidation state and to enable the metal values in the raw nodules to be leached in the leach solution.

2. The process as set forth in claim 1 wherein prior to the calcining step the ore is dried to remove a substantial portion of free moisture contained in the ore.

3. A process for reducing $MnO_2$ in a manganese ore containing copper and nickel base metal values to enable the copper and nickel base metal values in the ore to be leached comprising the steps of:
   a. introducing the ore into a fluid bed dryer and drying the ore in the drier at a temperature between the range of 200°–300° F for a period of time sufficient to liberate free moisture from the ore;
   b. introducing the ore dried in step (a) into a fluid bed calciner and calcining the ore to convert the $MnO_2$ to intermediate oxides of manganese; and,
   c. introducing the ore calcined in step (b) into a fluid bed reducer and reducing the intermediate oxides of manganese in the ore to MnO;
   d. introducing the reducer product from the fluid bed reducer into an ammonia-ammonium carbonate leach liquor containing cupric copper to oxidize the metals in the reducer product to a higher oxidation state in which they become solubilized in the leach liquor while the cupric copper is reduced to cuprous copper; and,
   e. oxidizing the cuprous copper produced in step (d) with raw manganese nodules to convert the cuprous copper to cupric copper and to enable the metal values in the raw nodules to be leached.

4. The process as set forth in claim 3 wherein in step (b) the ore is calcined to remove about one-half of its oxygen content.

5. The process as set forth in claim 4 wherein in step (c) the ore is reduced with a gas containing carbon monoxide and hydrogen.

6. The process as set forth in claim 3 wherein in step (c) the ore is reduced with synthesis gas.

7. The process as set forth in claim 3 wherein in step (c) the ore is reduced with a gas prepared by the partial oxidation of oil with oxygen enriched air.

8. The process as set forth in claim 7 wherein the ore is reduced with a gas prepared by the partial oxidation of Bunker C oil with oxygen enriched air.

9. The process as set forth in claim 3 wherein combined moisture is removed from the ore during the calcining of step (b).

10. The process as set forth in claim 9 wherein any free moisture remaining in the ore after being dried in step (a) is removed with the combined moisture in step (b).

11. The process as set forth in claim 3 wherein 0.7 lb. atoms of oxygen per 100 lbs. of bone-dry ore is removed from the ore during the calcination of step (b) and the reduction of step (c).

12. A process for treating a manganese ore containing copper and nickel base metal values to enable the copper and nickel base metal values in the ore to be recovered comprising the steps of:
   a. grinding the ore;
   b. drying the ground ore to remove free moisture;
   c. calcining the ground, dried ore in a fluid bed to remove remaining free moisture and combined moisture and to convert the $MnO_2$ in the ore to intermediate oxides of manganese;
   d. reducing the ground, dried, calcined ore in a fluid bed reducer to convert the oxides of manganese in the ore to MnO;

e. introducing the reducer product from the fluid bed reducer into an ammonia-ammonium carbonate leach liquor containing cupric copper to oxidize the metals in the reducer product to a higher oxidation state in which they become solubilized in the leach liquor while the cupric copper is reduced to cuprous copper; and, f. oxidizing the cuprous copper produced in step (d) with raw manganese nodules to convert the cuprous copper to cupric copper and to enable the metal values in the raw nodules to be leached.

13. The process as set forth in claim 12 wherein in step (b) the ground ore is dried at a temperature between the range of 200°–300° C.

14. The process as set forth in claim 12 wherein in step (b) the ground ore is dried in a fluid bed drier at a temperature between the range of 200°–300° C.

15. The process as set forth in claim 12 wherein in step (c) the ground dried ore is calcined at a temperature between the range of 1150°–1400° F.

16. The process as set forth in claim 12 wherein in step (c) the ground dried ore is calcined at a temperature of approximately 1350° F.

17. The process as set forth in claim 12 wherein in step (d) the ground, dried, calcined ore is reduced at a temperature between the range of 1200°–1500° F.

18. The process as set forth in claim 17 wherein the fuel oil is combusted with an amount of air sufficient to maintain an oxygen content of 6% by weight in the stack gases.

19. The process as set forth in claim 17 wherein the temperature at which the ore is reduced in step (d) is maintained at about 1350° F by forwarding scrubber fines from the dryer and calciner directly to the reducer.

20. The process as set forth in claim 17 wherein the temperature at which the ore is reduced in step (d) is maintained at about 1350° F by passing a portion of the dryer product directly to the reducer.

21. The process as set forth in claim 17 wherein the temperature at which the ore is reduced in step (d) is maintained at about 1350° F by cooling the ore with water.

22. The process as set forth in claim 12 wherein in step (c) the ground dried ore is calcined in a fluid bed by directly injecting and combusting fuel oil.

23. The process as set forth in claim 12 wherein in step (c) the ground, dried, ore is calcined in a fluid bed by directly injecting and combusting Bunker C fuel oil.

24. The process as set forth in claim 12 wherein the calcined product of step (c) is transmitted to the fluid bed of step (d) as underflow and wherein the carry over from the calcining step (c) is removed from the off gases and is added to the calciner underflow.

25. The process as set forth in claim 12 wherein the solid carry over is removed from the off gases by passing the off gases through a cyclone.

26. The process as set forth in claim 12 wherein the copper and nickel values are reduced to their elemental state in step (d).

27. The process as set forth in claim 12 wherein in step (d) the ground, dried, calcined ore is reduced with a gas containing carbon monoxide and hydrogen.

28. The process as set forth in claim 12 including the step of cooling the ore that is reduced in step (d) in a two-stage fluid bed.

29. The process as set forth in claim 12 wherein the ore that is reduced in step (d) is introduced into an ammonia-ammonium carbonate leach solution.

30. The process as set forth in claim 29 including the step of oxidizing the copper and nickel values in the leach solution.

31. The process as set forth in claim 30 including the step of extracting the copper and nickel values with an ion exchange extractant.

32. The process as set forth in claim 12 wherein in step (a) the ore is ground to yield a particulate ore with a particle size of approximately minus 6 mesh.

33. The process as set forth in claim 12 wherein in step (d), the ground ore is reduced by maintaining it within the fluid bed for a retention time of about 1 hour.

34. The process as set forth in claim 32 wherein the reductant feed ratio during the reducing which takes place in step (d) is about 0.62 lb-moles $CO + H_2$/100 lbs. of bone-dry feed.

35. The process as set forth in claim 12 wherein 75–85% of the calcine produced in step (c) is reduced in step (d).

36. A process for recovering at least one metal value from a manganese ore containing base metal values selected from the group consisting of copper, nickel, cobalt and molybdenum comprising the steps of:

a. drying the ore to remove free moisture;

b. calcining the dried ore in a fluid bed to remove remaining free moisture and combined moisture and to convert the $MnO_2$ in the ore to intermediate oxides of manganese;

c. reducing the calcined ore in a fluid bed reducer to convert the oxides of manganese in the ore to MnO;

d. introducing the reducer product from the fluid bed reducer into an ammonia-ammonium carbonate leach liquor containing cupric copper to oxidize the metals in the reducer product to a higher oxidation state in which they become solubilized in the leach liquor while the cupric copper is reduced to cuprous copper;

e. oxidizing the cuprous copper produced in step (d) with raw manganese nodules to convert the cuprous copper to cupric copper and to enable the metal values in the raw nodules to be leached; and, f. recovering metal values from the pregnant leach liquor.

37. The process as set forth in claim 36 wherein the metal is recovered from the pregnant leach liquor by an oxime type liquid ion exchange reactant.

38. The process as set forth in claim 36 wherein the reduced calcine is dropped directly into an aqueous leach liquor containing ammonia and carbon dioxide.

39. The process as set forth in claim 36 wherein the reduced caline is cooled to about 500° F and is subsequently added to the leach liquor.

40. The process as set forth in claim 39 wherein the reduced calcine is cooled in a fluid bed cooler.

41. The process as set forth in claim 40 wherein the leach liquor to which the reduced nodules are added is wet ground and is subsequently introduced into a mixed leaching tank into which oxygen is added.

42. The process as set forth in claim 41 wherein the pregnant liquor is separated from the slurry in a first state leach thickener tank and wherein a portion of the pregnant liquor is recycled to the leach liquor into which the reduced nodules are first added, and wherein a portion of the pregnant liquor is directed to liquid ion exchange treatment for recovery of metal values.

43. The process as set forth in claim 42 wherein the slurry after separation from the pregnant liquor is flowed to a second stage leach in which the slurry is oxidized with raw manganese nodules and is subsequently separated with the liquid being recycled to the first stage leach thickener and the slurry being flowed to a wash system.

44. The process as set forth in claim 43 wherein the slurry is washed in a countercurrent decantation wash system and the wash effluent is flowed to the second stage leach.

45. A process for treating a manganese ore containing base metal values selected from the group of copper and nickel values to enable the copper and nickel base metal values in the ore to be recovered comprising the steps of:
   a. grinding the ore;
   b. drying the ground ore to remove free moisture;
   c. calcining the ground, dried ore in a fluid bed to remove remaining free moisture and combined moisture and to convert the $MnO_2$ in the ore to intermediate oxides of manganese;
   d. reducing the ground, dried, calcined ore in a fluid bed reducer to convert the oxides of manganese in the ore to MnO;
   e. introducing the reducer product from the fluid bed reducer into an ammonia-ammonium carbonate leach liquor containing cupric copper to oxidize the metals in the reducer product to a higher oxidation state in which they become solubilized in the leach liquor while the cupric copper is reduced to cuprous copper; and,
   f. oxidizing the cuprous copper produced in step (d) with dryer fines produced in step (b) to convert the cuprous copper to cupric copper and to enable the metal values in the dryer fines to be leached.

46. A process for treating a manganese ore containing copper and nickel values to enable the copper and nickel values in the ore to be recovered comprising the steps of:
   a. grinding the ore;
   b. drying the ground ore to remove free moisture;
   c. calcining the ground, dried ore in a fluid bed to remove remaining free moisture and combined moisture and to convert the $MnO_2$ in the ore to intermediate oxides of manganese;
   d. reducing the ground, dried, calcined ore in a fluid bed reducer to convert the oxides of manganese in the ore to MnO;
   e. introducing the reducer product from the fluid bed reducer into an ammonia-ammonium carbonate leach liquor containing cupric copper to oxidize the copper and nickel in the reducer product to a higher oxidation state in which they become solubilized in the leach liquor while the cupric copper is reduced to cuprous copper; and,
   f. oxidizing the cuprous copper produced in step (d) with calciner fines produced in step
   c. to convert the cuprous copper to cupric copper and to enable the metal values in the raw nodules to be leached.

* * * * *